United States Patent
Mintz et al.

(10) Patent No.: US 8,364,439 B2
(45) Date of Patent: Jan. 29, 2013

(54) SYSTEM AND METHOD FOR DETECTION OF CONCEALED CARGO IN A VEHICLE BY CENTER OF MASS MEASUREMENT

(75) Inventors: Nathan M. Mintz, Redondo Beach, CA (US); Michael K. Holz, Newton Centre, MA (US); Brandon W. Pillans, Plano, TX (US); Gregory V. Burnett, Murphy, TX (US); Anthony Ross, Frisco, TX (US)

(73) Assignee: Raytheon Company, Waltham, MA (US)

( * ) Notice: Subject to any disclaimer, the term of this patent is extended or adjusted under 35 U.S.C. 154(b) by 293 days.

(21) Appl. No.: 12/833,292

(22) Filed: Jul. 9, 2010

(65) Prior Publication Data

US 2012/0010851 A1 Jan. 12, 2012

(51) Int. Cl.
*G06F 15/00* (2006.01)
*G01M 1/22* (2006.01)
*B60R 21/16* (2006.01)

(52) U.S. Cl. .................... 702/173; 701/124; 280/735
(58) Field of Classification Search .............. 702/173, 702/174; 177/25.13, 25.14; 701/36, 124; 280/735
See application file for complete search history.

(56) References Cited

U.S. PATENT DOCUMENTS

| | | | |
|---|---|---|---|
| 3,835,945 A | 9/1974 | Yamanaka et al. | |
| 4,049,069 A | 9/1977 | Tamamura et al. | |
| 4,804,052 A | 2/1989 | Griffen | |
| 4,957,178 A | 9/1990 | Mills | |
| 6,052,065 A | 4/2000 | Glover | |
| 6,052,068 A | 4/2000 | Price R-W et al. | |
| 6,259,369 B1 | 7/2001 | Monico | |
| 6,459,050 B1 | 10/2002 | Muhs et al. | |
| 6,536,961 B1 | 3/2003 | Gillies | |
| 6,997,060 B2 | 2/2006 | Morikawa | |
| 7,019,660 B2 | 3/2006 | Seto et al. | |
| 7,068,185 B2 | 6/2006 | Kavner | |
| 7,305,324 B2 * | 12/2007 | Beshears et al. | 702/173 |
| 7,339,495 B2 | 3/2008 | Kavner | |
| 7,349,007 B2 | 3/2008 | Millar | |
| 7,436,299 B2 | 10/2008 | Shieh et al. | |
| 7,436,315 B2 | 10/2008 | Kamizono et al. | |
| 7,490,841 B2 | 2/2009 | Castello et al. | |
| 7,504,965 B1 | 3/2009 | Windover et al. | |
| 2006/0155430 A1 | 7/2006 | Burgess | |
| 2006/0202862 A1 | 9/2006 | Ratnakar | |

* cited by examiner

*Primary Examiner* — Bryan Bui
(74) *Attorney, Agent, or Firm* — Daly, Crowley, Mofford & Durkee, LLP

(57) ABSTRACT

A system and computer-implemented method for detecting concealed cargo and/or concealed passengers in a vehicle includes obtaining weight distribution data for the vehicle; obtaining vehicle loading data; measuring a center of mass of the vehicle to obtain an actual center of mass position of the vehicle; and executing one or more computer program modules configured to determined a predicted center of mass position of the vehicle using the obtained vehicle loading data and the obtained weight distribution data of the vehicle; compare the actual center of mass position of the vehicle with the predicted center of mass position of the vehicle; and provide a signal if the actual center of mass position of the vehicle departs from the predicted center of mass position of the vehicle by at least a predetermined threshold, the signal being representative of concealed cargo and/or concealed passengers in the vehicle.

23 Claims, 15 Drawing Sheets

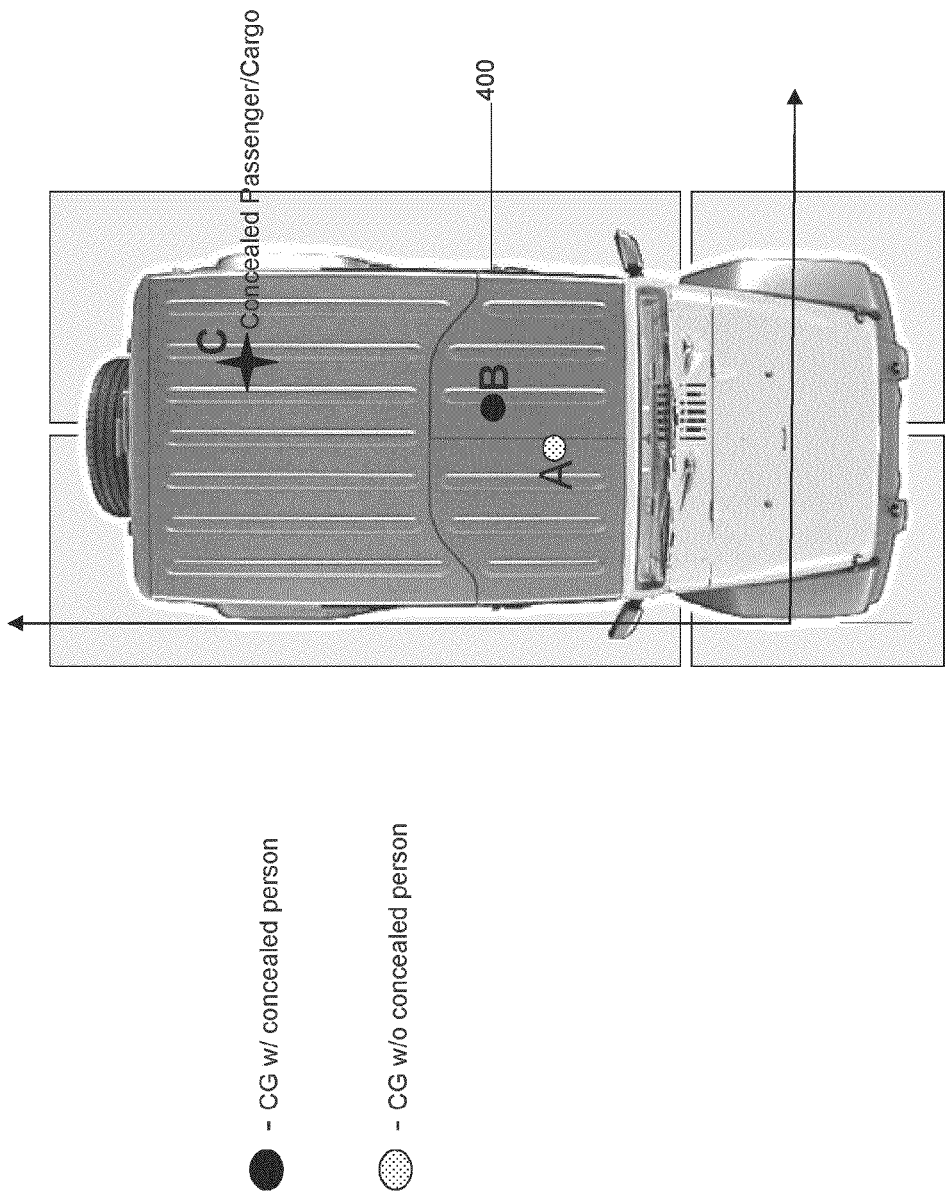

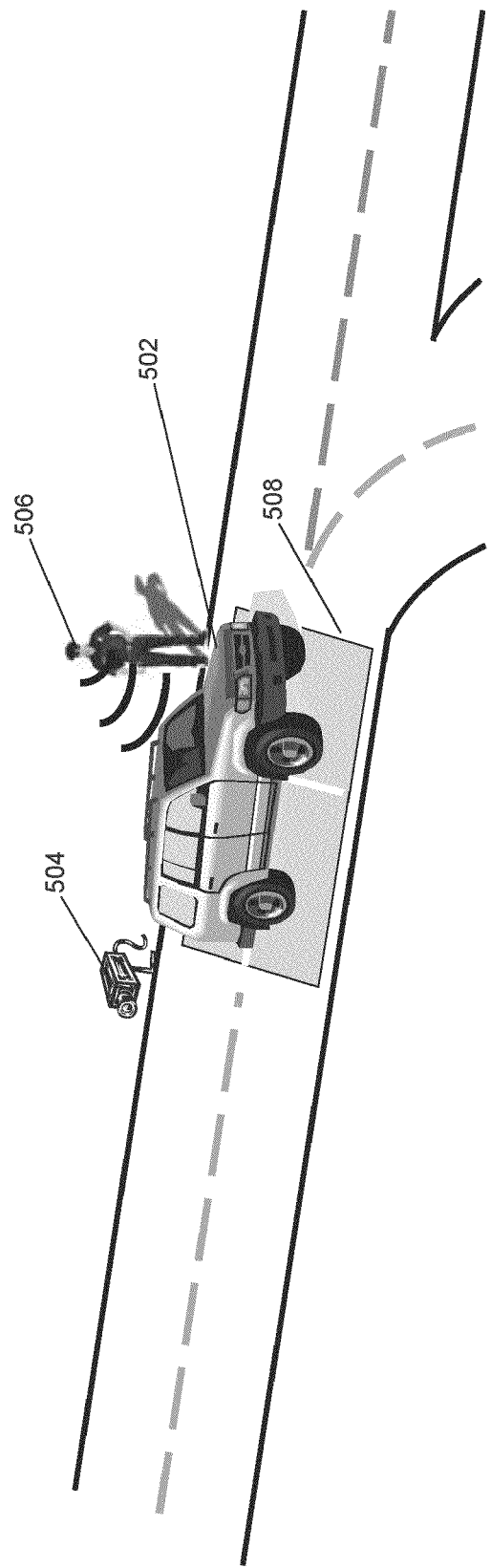

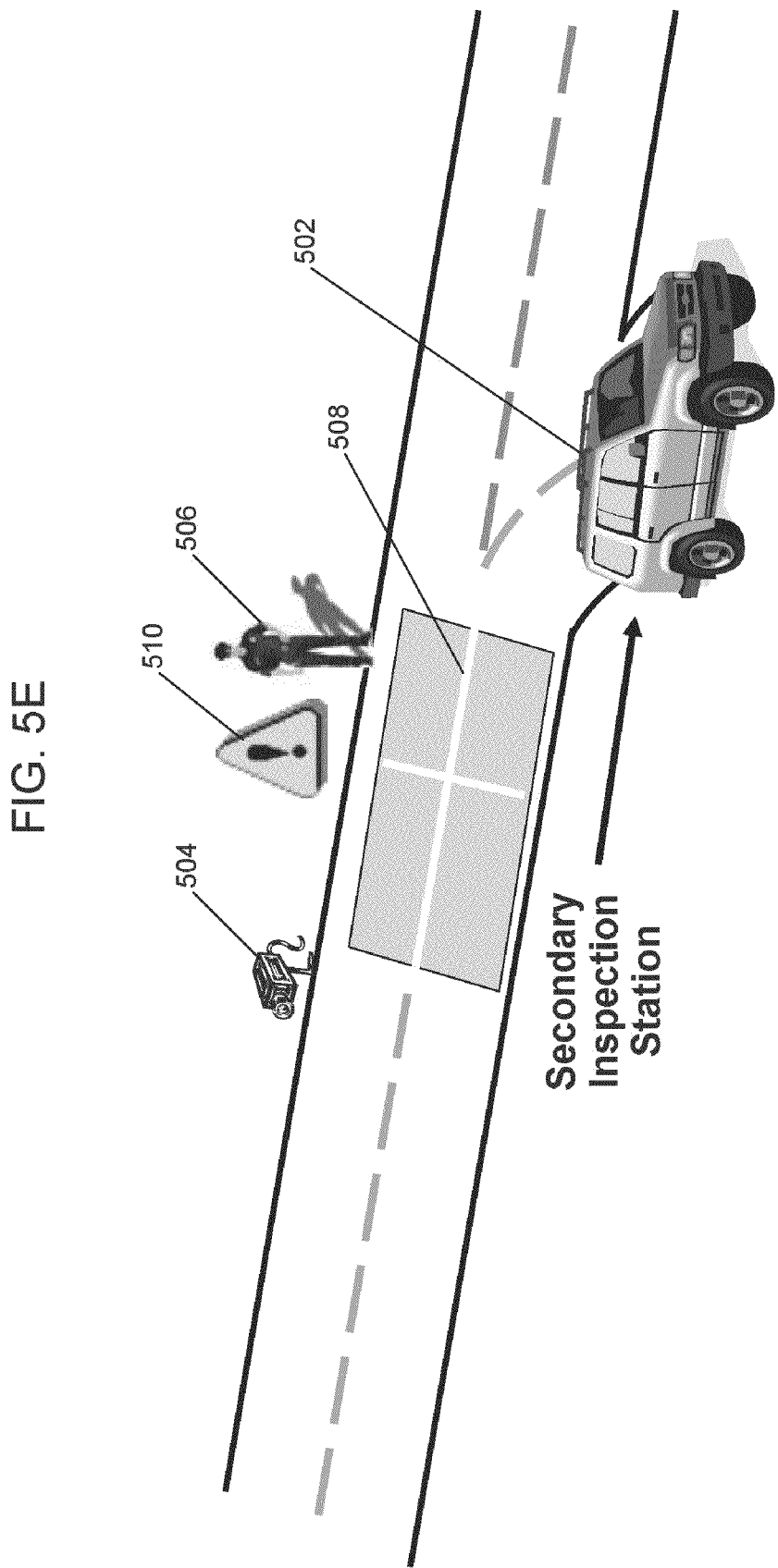

2 Passenger Car without hidden passenger

2 Passenger Car with a passenger hidden in dashboard

2 Passenger Car with a passenger hidden in various locations

2 Passenger SUV with a passenger hidden in various locations

2 Passenger SUV with a passenger hidden in various locations

SYSTEM AND METHOD FOR DETECTION OF CONCEALED CARGO IN A VEHICLE BY CENTER OF MASS MEASUREMENT

BACKGROUND

The present disclosure relates to a system and a method for detecting concealed cargo and/or concealed passengers in a vehicle.

Detection of concealed passengers or concealed cargo in a vehicle can be difficult without inspecting its interior space and/or compartments. One of the primary challenges in detecting concealed passengers or concealed cargo in a vehicle is the relative abundance of compartments available in a vehicle in which a passenger or cargo can be hidden.

Numerous methods exist for screening the vehicle for concealed passengers or concealed cargo.

A full manual inspection (e.g., by guards or border patrol personnel) of the vehicle is the most obvious, and generally extremely effective method for detecting concealed cargo and/or concealed passengers in a vehicle. However, such manual inspection is often time consuming. When such manual inspection is conducted at high traffic points of entry, such as border crossings, checkpoints, and tunnels, the guards or border patrol personnel have a minimal time available to conduct the search, without severely impacting traffic throughput. Further, such inspection is not completely foolproof.

Vehicles may be screened by interrogating the driver of the vehicle at a checkpoint, determining if an additional search is required based on the interrogation, and routing the vehicle to a secondary search area to perform additional searching to detect concealed cargo and/or concealed passengers in a vehicle. This type of screening may be generally referred to as primary/secondary search method.

High technology systems may be also used to perform vehicle screening, but are generally extremely expensive with very low throughput. One example of such a high technology system is a system built by SAIC called VACIS. The VACIS system includes a gamma-ray imager system in which suspicious vehicles are run through a special screening lane. However, such system is extremely expensive (i.e., 1 M+/unit) and requires between 30 and 60 seconds to conduct a check, thus, impacting traffic throughput.

The present disclosure provides improvements over the prior art vehicle screening methods and systems for detecting concealed cargo and/or concealed passengers in a vehicle.

SUMMARY

One embodiment relates to a computer-implemented method for detecting concealed cargo and/or concealed passengers in a vehicle. The method is implemented in a computer system comprising one or more processors configured to execute one or more computer program modules. The method includes obtaining weight distribution data for the vehicle using a vehicle identifying system; obtaining vehicle loading data; measuring a center of mass of the vehicle using a weight scale system to obtain an actual center of mass position of the vehicle; and executing, on the one or more processors of the computer system, one or more computer program modules configured to: determine a predicted center of mass position of the vehicle using the obtained vehicle loading data and the obtained weight distribution data of the vehicle; compare the actual center of mass position of the vehicle with the predicted center of mass position of the vehicle; and provide a signal if the actual center of mass position of the vehicle departs from the predicted center of mass position of the vehicle by at least a predetermined threshold. The signal is representative of concealed cargo and/or concealed passengers in the vehicle.

Another embodiment relates to a system for detecting concealed cargo and/or concealed passengers in a vehicle. The system includes a vehicle identifying system, a weight scale system, and a processor. The vehicle identifying system is configured to obtain weight distribution data for the vehicle. The weight scale system is configured to measure a center of mass of the vehicle to obtain an actual center of mass position of the vehicle. The processor is configured to receive vehicle loading data; determine a predicted center of mass position of the vehicle using the vehicle loading data and the weight distribution data of the vehicle; compare the actual center of mass position of the vehicle with the predicted center of mass position of the vehicle; and provide a signal if the actual center of mass position of the vehicle departs from the predicted center of mass position of the vehicle by at least a predetermined threshold. The signal is representative of concealed cargo and/or concealed passengers in the vehicle.

Yet, another embodiment relates to a shared network system that includes a plurality of geographically separate systems for detecting concealed cargo and/or concealed passengers in a vehicle. Each system in said plurality of systems includes a vehicle identifying system, a weight scale system, and a processor. The vehicle identifying system is configured to obtain weight distribution data for the vehicle. The weight scale system is configured to measure a center of mass of the vehicle to obtain an actual center of mass position of the vehicle. The processor is configured to receive vehicle loading data; determine a predicted center of mass position of the vehicle using the vehicle loading data and the weight distribution data of the vehicle; compare the actual center of mass position of the vehicle with the predicted center of mass position of the vehicle; provide an error signal if the actual center of mass position of the vehicle departs from the predicted center of mass position of the vehicle by at least a predetermined threshold, the signal being representative of concealed cargo and/or concealed passengers in the vehicle; and store information about the vehicle after validating the provided error signal. The shared network system is configured to share the information about the vehicle between the plurality of systems over a networked connection.

These and other aspects of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one example of the present disclosure, the structural components illustrated herein can be considered drawn to scale. It is to be expressly understood, however, that many other configurations are possible and that the drawings are for the purpose of example, illustration and description only and are not intended as a definition or to limit the scope of the present disclosure. It shall also be appreciated that the features of one embodiment disclosed herein can be used in other embodiments disclosed herein. As used in the specification and in the claims, the singular form of "a", "an", and "the" include plural referents unless the context clearly dictates otherwise.

BRIEF DESCRIPTION OF THE DRAWINGS

FIG. 4 shows an exemplary shift in a center of mass position for a vehicle because of the presence of a concealed cargo/passenger in the vehicle accordance with an embodiment of the present disclosure;

FIGS. 5A-E show an exemplary system for detecting concealed cargo and/or concealed passengers in a vehicle in accordance with an embodiment of the present disclosure, specifically, FIG. 5A shows a vehicle indentifying system obtaining weight distribution data for the vehicle; FIG. 5B shows obtaining vehicle loading data; FIG. 5C shows a weight scale system measuring a center of mass of the vehicle to obtain an actual center of mass position of the vehicle; FIG. 5D shows a signal that provided if the actual center of mass position of the vehicle departs from a predicted center of mass position of the vehicle by at least a predetermined threshold; and FIG. 5E shows the vehicle being sent to a secondary inspection location for further inspection;

DETAILED DESCRIPTION

A method and a system for detecting concealed cargo and/or concealed passengers in a vehicle exploit mass of a concealed passenger or a concealed cargo in the vehicle as a fundamental physical attribute. For example, as shown in FIG. 4, the center of mass position of vehicle 400 with concealed cargo/passenger C (e.g., hidden in the trunk) is at position B and the center of mass position of vehicle 400 without the concealed cargo/passenger C is at position A. Therefore, as clearly shown in FIG. 4, the concealed cargo/passenger C in the vehicle 400 shifts the center of mass position of the vehicle from position A to position B.

In the method and the system of the present disclosure, weight distribution data from a vehicle indentifying system and visible occupancy data input at a primary inspection station are used to determine an estimated or a predicted center of mass position of the vehicle. When a measured center of mass position of the vehicle varies from the estimated or predicted center of mass position of the vehicle by a predetermined threshold (i.e., equal to a weight of full tank of gas of the vehicle), an alarm is generated to route the car to a secondary inspection station. Otherwise, the vehicle continues with minimal interruption (i.e., without impacting traffic throughput).

Figure 1:
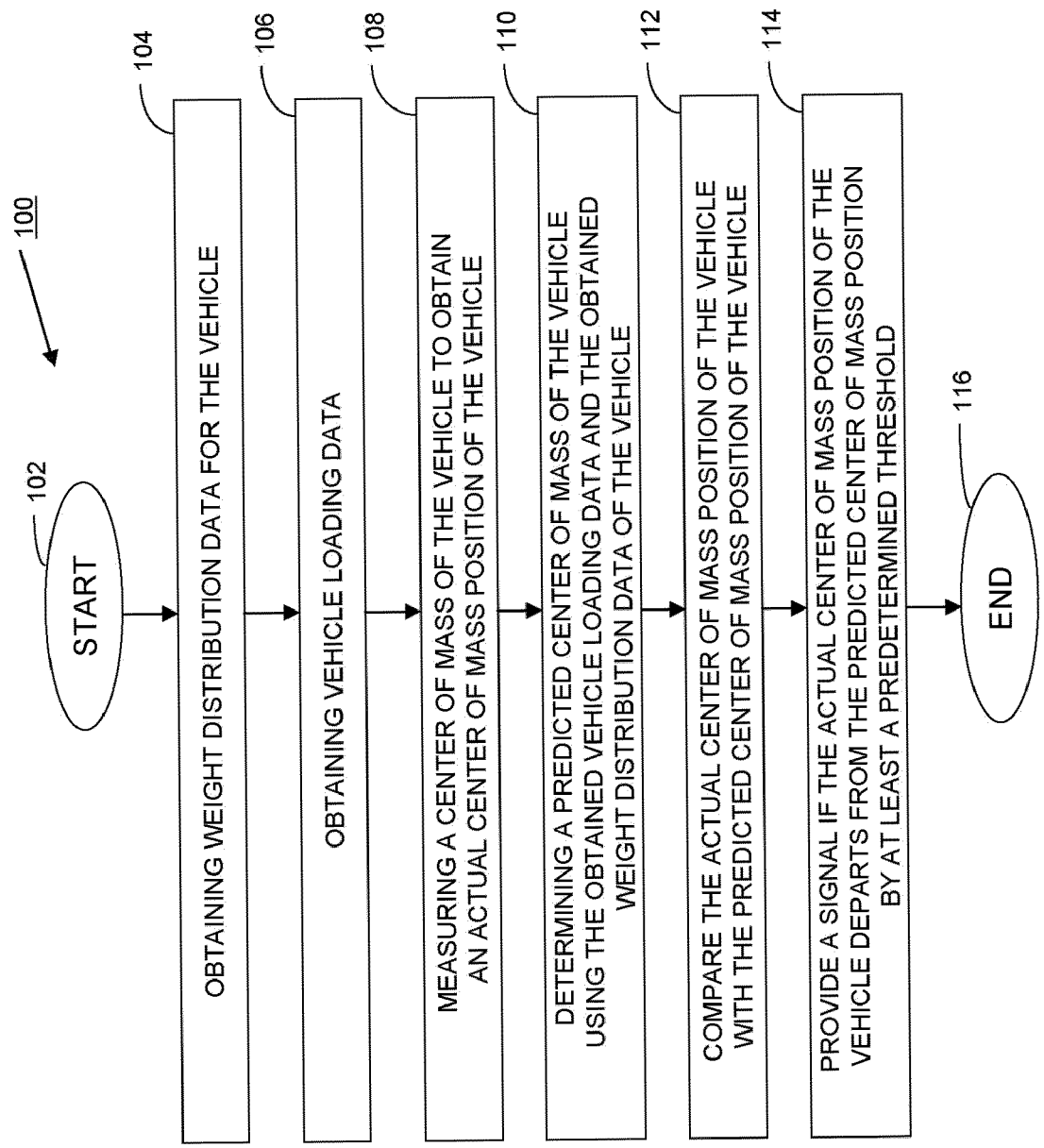
FIG. 1 is a flow chart illustrating a method for detecting concealed cargo and/or concealed passengers in a vehicle in accordance with an embodiment of the present disclosure.

FIG. 1 is a flow chart illustrating a computer implemented method 100 for detecting concealed cargo and/or concealed passengers in a vehicle in accordance with an embodiment of the present disclosure. The method 100 is implemented in a computer system comprising one or more processors 206 (as shown in and explained with respect to FIG. 2) configured to execute one or more computer programs modules. In one embodiment, the processor 206 (as shown in and explained with respect to FIG. 2) can comprise either one or a plurality of processors therein.

The method 100 begins at procedure 102. At procedure 104, weight distribution data for the vehicle is obtained using a vehicle identifying system 202 (as shown in and explained with respect to FIG. 2). In one embodiment, the vehicle identifying system 202 includes a vehicle identifier 504 (as shown in FIG. 5) and a motor vehicles database. The motors vehicles database and different types of vehicle identifiers used by the system 200 are explained in detail below with respect to the system 200.

The vehicle identifying system 202 is configured to obtain unique information of the vehicle (e.g., from a standoff range) using the vehicle identifier 504 (as shown in FIG. 5), and then the obtained unique information of the vehicle is checked against the motor vehicles database to obtain make, model, and (model) year of the vehicle. In one embodiment, the unique information of the vehicle may include VIN, license plate information, RFID tag or transponder (e.g., of frequent commuters) present on the vehicle, or any other unique information of the vehicle that provides the make, model, and year of the vehicle. The vehicle identifying system 202 is further configured to obtain the weight distribution data of the vehicle associated with obtained make, model, and year of the vehicle.

Figure 5A:
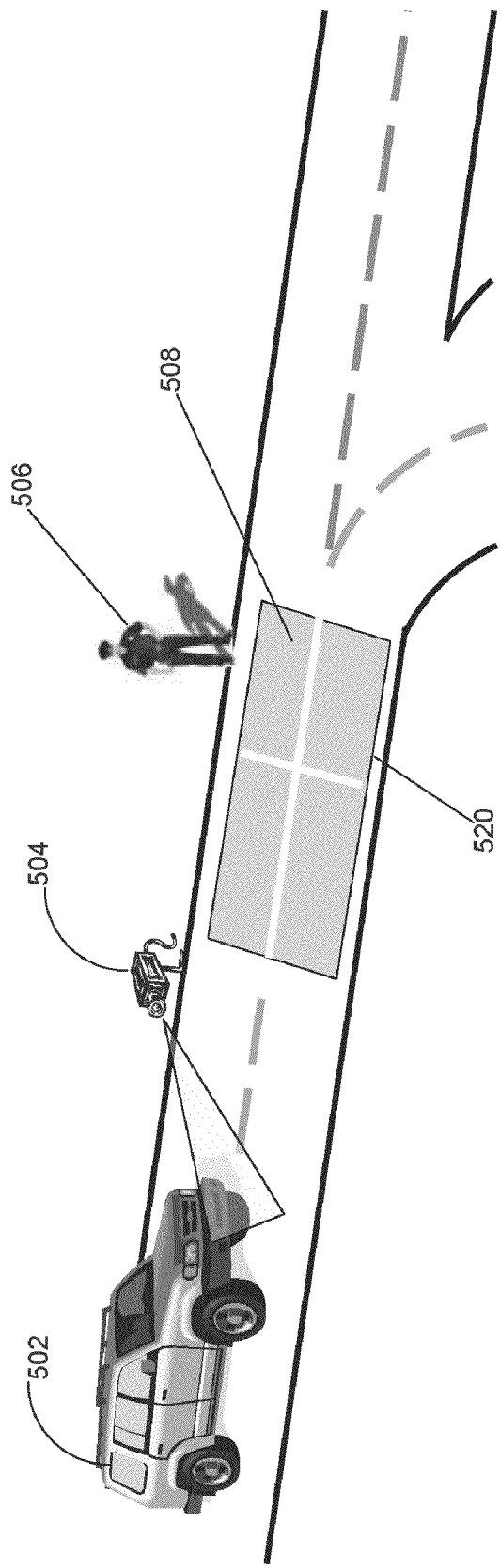

Referring to FIG. 5A, as a vehicle 502 is approaching a border patrol check point 520, the vehicle identifier 504 is configured to obtain the unique information of the vehicle 502. This unique information of the vehicle 502 is then checked against the motor vehicles database to obtain a) make, model, and (model) year of the vehicle 502, and b) the weight distribution data of the vehicle 502 associated with make, model, and (model) year of the vehicle 502.

At procedure 106, vehicle loading data is obtained. The vehicle loading data includes number of passengers in the vehicle, location of the passengers in the vehicle, sex of the passengers in the vehicle, body structure of the passengers, fuel tank level in the vehicle, a mode of travel and/or whether one or more of the passengers in the vehicle is an adult or a child.

In one embodiment, as shown in FIG. 5B, a border patrol officer 506 visually inspects the vehicle 502 (e.g., as the vehicle is on a weight scale system 508) and inputs the vehicle loading data into the system 200 using a user interface. In another embodiment, the vehicle loading data may be obtained automatically as will be explained in detail with respect to system 200.

Figure 5C:
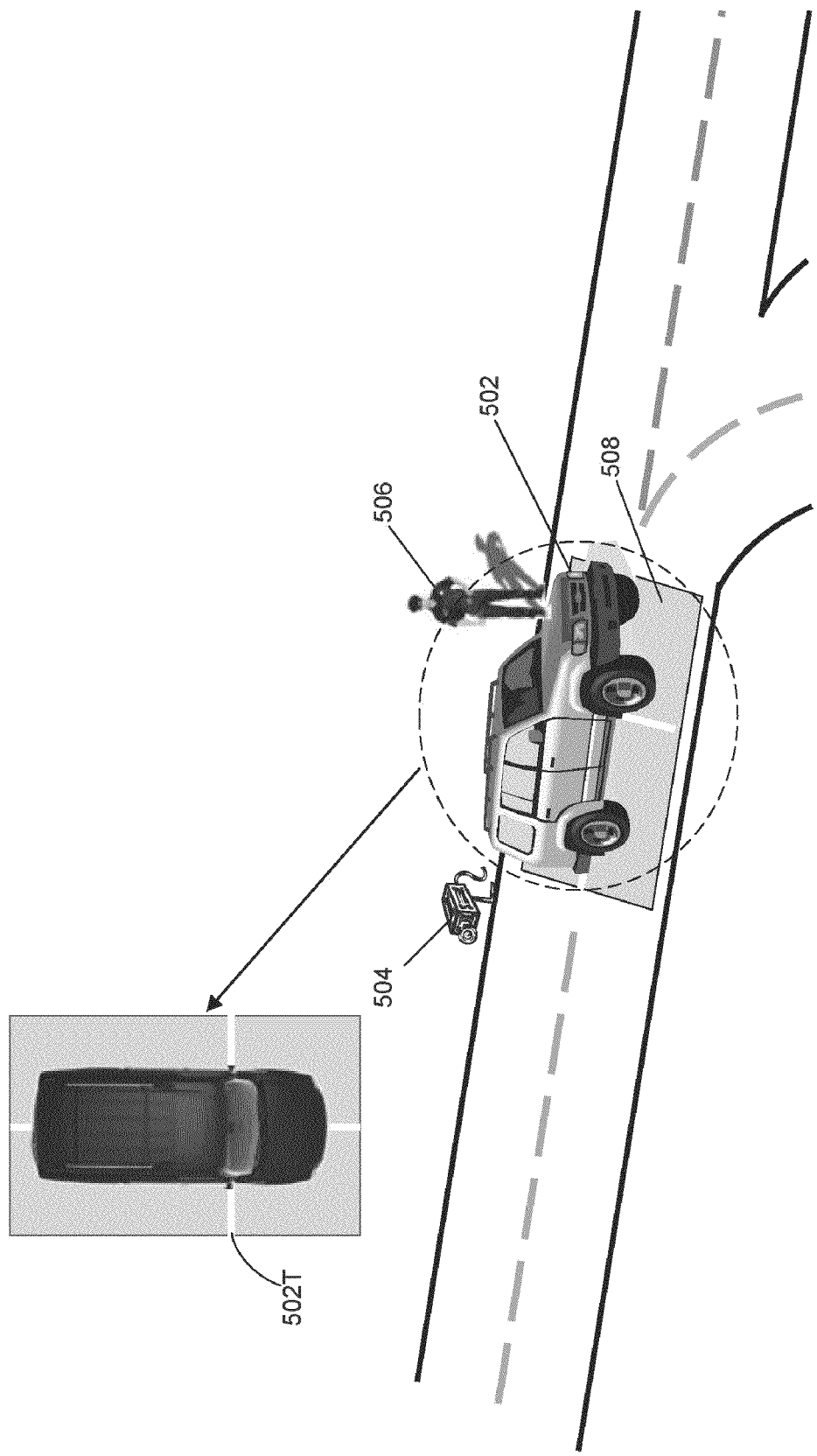

At procedure 108, a center of mass of the vehicle is measured using a weight scale system 204 (as shown in and explained with respect to FIG. 2) or the weight scale system 508 (as shown in and explained with respect to FIG. 5A-E) to obtain an actual center of mass position of the vehicle. FIG. 5C shows the vehicle 502 on the weight scale system 508, as the center of mass of the vehicle 502 is measured to obtain an actual center of mass position of the vehicle 502.

At procedure 110, the processor 206 (as shown in and explained with respect to FIG. 2) is configured to determine a predicted center of mass position of the vehicle using the obtained vehicle loading data and the obtained weight distribution data of the vehicle.

At procedure 112, the processor 206 (as shown in and explained with respect to FIG. 2) is configured to compare the actual center of mass position of the vehicle with the predicted center of mass position of the vehicle.

Figure 5D:
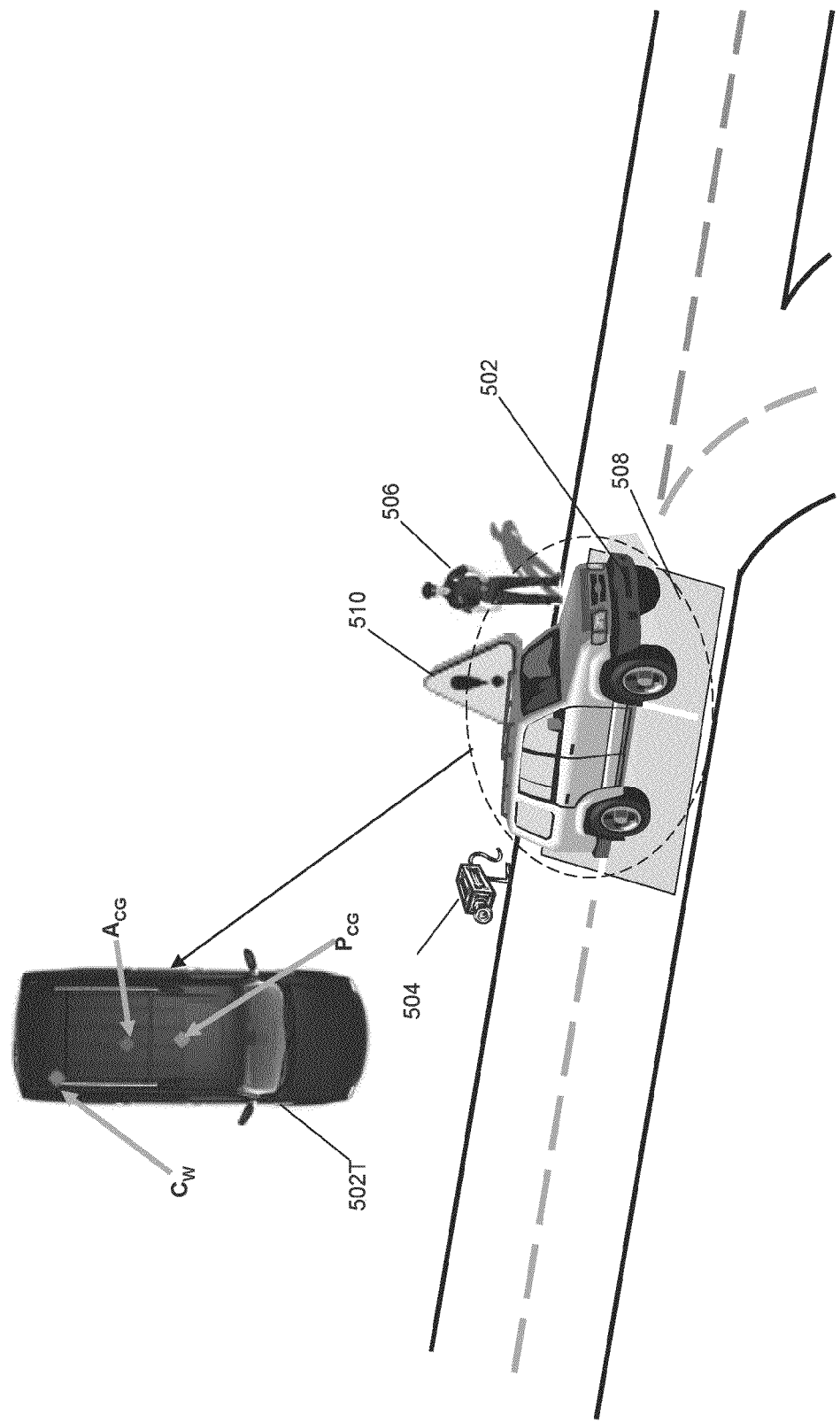

FIG. 5D shows the vehicle 502 along with its top view 502T. The actual center of mass position $A_{CG}$ and the predicted center of mass position $P_{CG}$ of the vehicle 502 are indicated on the top view 502T. A concealed weight (i.e., passenger or cargo) $C_W$ that resulted in a shift in center of the mass position of the vehicle is also indicated on the top view 502T.

At procedure 114, the processor 206 (as shown in and explained with respect to FIG. 2) is configured to provide a signal if the actual center of mass position of the vehicle departs from the predicted center of mass position of the vehicle by at least a predetermined threshold. The signal is representative of concealed cargo and/or concealed passengers in the vehicle. In one embodiment, the predetermined threshold is equal to a weight of full tank of gas of the vehicle. In other embodiment, the predetermined threshold is equal to at least a portion of a weight of full tank of gas of the vehicle. In such an embodiment, for example, the predetermined threshold is equal to half or three-fourth of the weight of full tank of gas of the vehicle.

FIG. 5D shows error signal 510 generated as the actual center of mass position $A_{CG}$ of the vehicle 502 departs from the predicted center of mass position $P_{CG}$ of the vehicle 502 by at least a predetermined threshold. In one embodiment, the error signal 510 may be displayed to the border patrol officer using a user interface.

FIG. 5E shows a procedure in which the border patrol officer 506, based on the received error signal 510, sends the vehicle 502 to a secondary inspection station for further inspection.

The method 100 ends at procedure 116. In one embodiment, the procedures 102-116 can be performed by one or more computer program modules that can be executed by one or more processors 206 (as shown in and explained with respect to FIG. 2).

Figure 2:
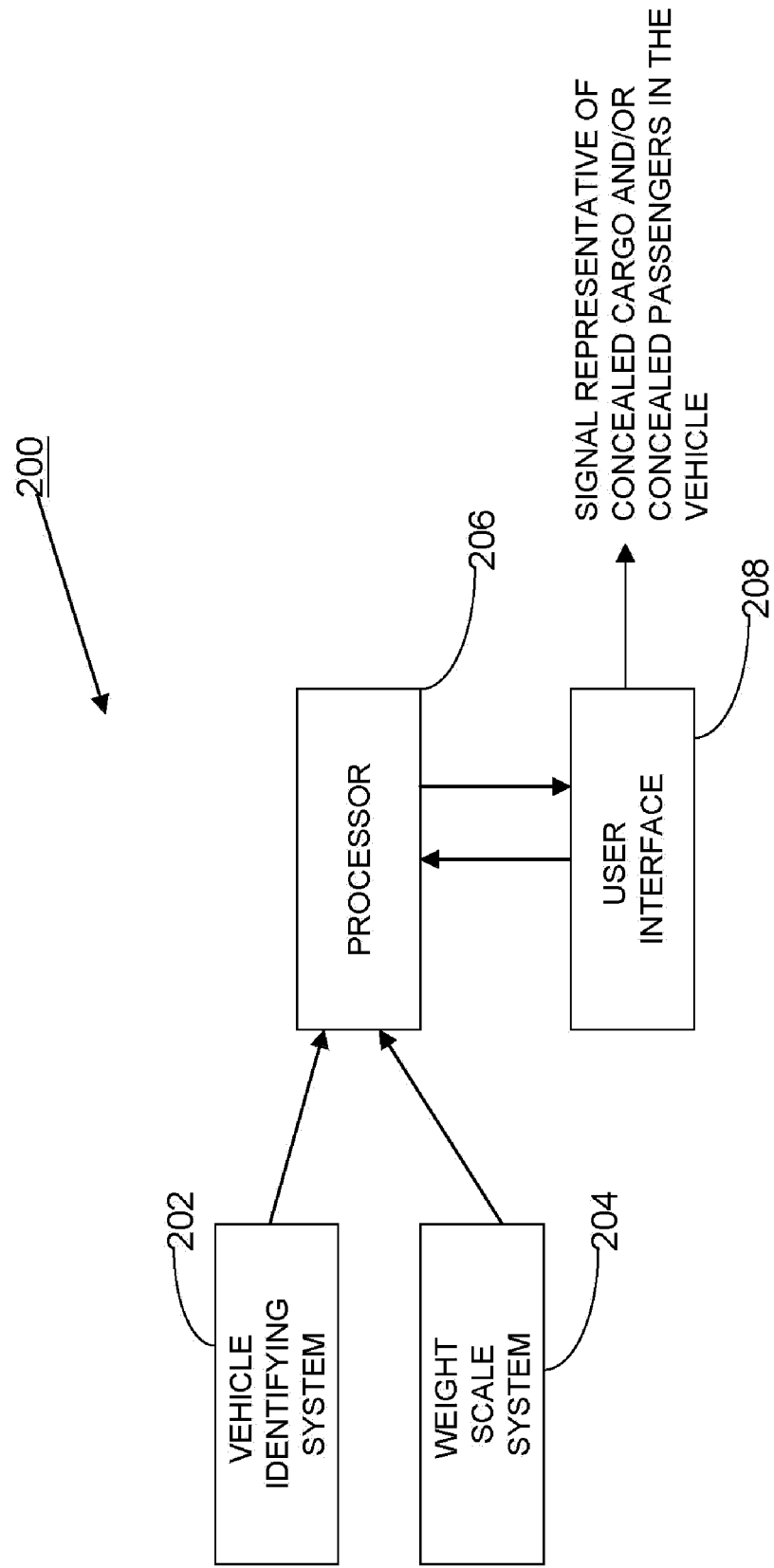
FIG. 2 shows a system for detecting concealed cargo and/or concealed passengers in a vehicle in accordance with an embodiment of the present disclosure.

The system 200 for detecting concealed cargo and/or concealed passengers in a vehicle in accordance with an embodiment of the present disclosure is shown in FIG. 2. The system 200 may include the vehicle identifying system 202, the weight scale system 204, the processor 206, and a user interface 208.

The vehicle identifying system 202 is configured to obtain weight distribution data for the vehicle. In one embodiment, the vehicle identifying system 202 includes a motor vehicles database and a vehicle identifier.

In one embodiment, the motor vehicles database may include a listing of license plate numbers, a valid Vehicle Identification Number (VIN), make, model, year, any RFID tags (e.g., for frequent commuters), weight distribution data, and any other information associated with the vehicle. For example, one database table in the motor vehicles database may include a listing of license plate numbers, a valid Vehicle Identification Number (VIN), make, model, year, any RFID tags (e.g., for frequent commuters) associated with the vehicle, and another database table in the motor vehicles database may include a listing of weight distribution data, make, model, and year of the vehicle.

In one embodiment, for example, if a VIN of the vehicle is obtained using a vehicle identifier (i.e., VIN reader), then the VIN is checked against the motor vehicles database to determine make, model year and model of the vehicle that is associated with the obtained VIN, and then the weight distribution data of the vehicle associated with the determined make, year and model of the vehicle is obtained. In one embodiment, the motor vehicles database may be configured to constantly learn and adapt itself based on the border patrol officer or personnel inputs.

In one embodiment, the vehicle identifier may be located in the path of the vehicle as the vehicle is approaching the border patrol checkpoint, and the motor vehicles database may be located at a remote location. In such an embodiment, the vehicle identifier is configured to send the obtained unique identifier of the vehicle directly over a remote connection to the motor vehicles database, and the motor vehicles database is configured to send back the weight distribution data of the vehicle associated with the unique identifier of the vehicle directly over a remote connection to the processor of the system 200. In another embodiment, both the motor vehicles database and the vehicle identifier are located at the same location.

In one embodiment, the vehicle identifier may be a license plate reader capable of reading license plates from a standoff range. For example, in one embodiment, the license plate reader may be a ZIPLOCK® available from Raytheon. Such a license plate reader that is capable of reading license plates from a standoff range is described in U.S. Pat. Nos. 6,536,961; 7,068,185; 7,339,495; and 7,504,965, hereby incorporated by reference in their entirety. The license plate reader may be connected to the motor vehicles database. In such an embodiment, where the vehicle identifying system 202 includes a license plate reader, the vehicle identifying system 202 is configured to read a license plate of the vehicle from a standoff range, and then the captured license plate data is forwarded to a conventional pattern recognition system to check the license plate data of the vehicle against the motor vehicles database to obtain make, year, and model of the vehicle, and hence obtain the weight distribution data of the vehicle associated with obtained make, year, and model of the vehicle.

In another embodiment, the vehicle identifier may be a VIN reader capable of reading VIN of the vehicle from a standoff range. For example, in one embodiment, the VIN reader may be a VIN bar code scanner. An exemplary VIN reader that is capable of reading VIN is described in U.S. Pat. No. 6,052,065, hereby incorporated by reference in its entirety. The VIN reader may be connected to the motor vehicles database. In such an embodiment, where the vehicle identifying system 202 includes a VIN reader, the vehicle identifying system 202 is configured to read VIN of the vehicle from a standoff range, and then the captured VIN is checked against the motor vehicles database to obtain make, year, and model of the vehicle, and hence obtain the weight distribution data of the vehicle associated with obtained make, year and model of the vehicle.

In yet another embodiment, the vehicle identifier may be a RFID reader capable of reading RFID tag or transponder (e.g., of frequent commuters) present on the vehicle from a standoff range. For example, in one embodiment, the RFID reader may be programmed to capture vehicle information transmitted via an RFID tag or transponder present on the vehicle. An exemplary RFID reader that is programmed to capture vehicle information transmitted via an RFID tag or transponder present on the vehicle may be in the form of a RFID reader described in U.S. Pat. No. 6,259,369 and U.S. Patent Application Publication No. 20060155430, hereby incorporated by reference in their entirety. The RFID reader may be connected to the motor vehicles database. In such an embodiment, where the vehicle identifying system 202 includes a RFID reader, the vehicle identifying system 202 is configured to read the vehicle information stored in a RFID tag located on the vehicle from a standoff range, and then the captured vehicle information is checked against the motor vehicles database to obtain make, year, and model of the vehicle, and hence obtain the weight distribution data of the vehicle associated with obtained make, year and model of the vehicle.

In yet another embodiment, the vehicle identifier may be Automatic Target Recognition (ATR) software that is capable of recognizing the vehicle based on data obtained from sensors associated with the vehicle. For example, in one embodiment, the Automatic Target Recognition (ATR) may be in the form of a system described in U.S. Pat. No. 6,052,068 and U.S. Patent Application Publication No. 20060202862, hereby incorporated by reference in their entirety. The Automatic Target Recognition (ATR) software may be connected to the motor vehicles database. In such an embodiment, where the vehicle identifying system 202 includes an Automatic Target Recognition (ATR) software, the vehicle identifying system 202 is configured to identify the vehicle, and then the captured vehicle information is checked against the motor vehicles database to obtain make, year and model of the vehicle, and hence obtain the weight distribution data of the vehicle associated with obtained make, year and model of the vehicle.

The weight scale system 204 is configured to measure a center of mass of the vehicle to obtain an actual center of mass position of the vehicle. In one embodiment, the weight scale system 204 is disposed at the stopping location of a vehicle in front of the primary inspection border patrol personnel in the primary inspection station. In other words, the weight scale system 204 is located at the border patrol checkpoint.

Figure 11B:
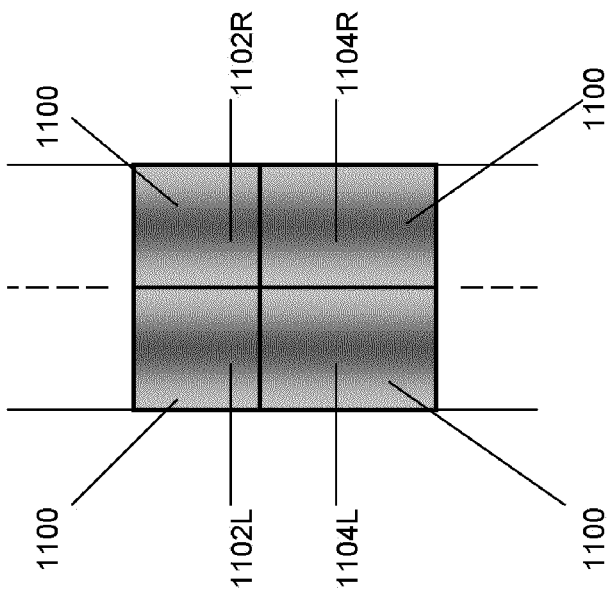
FIGS. 11A and 11B show an exemplary weight scale system in accordance with an embodiment of the present disclosure.
Figure 11A:
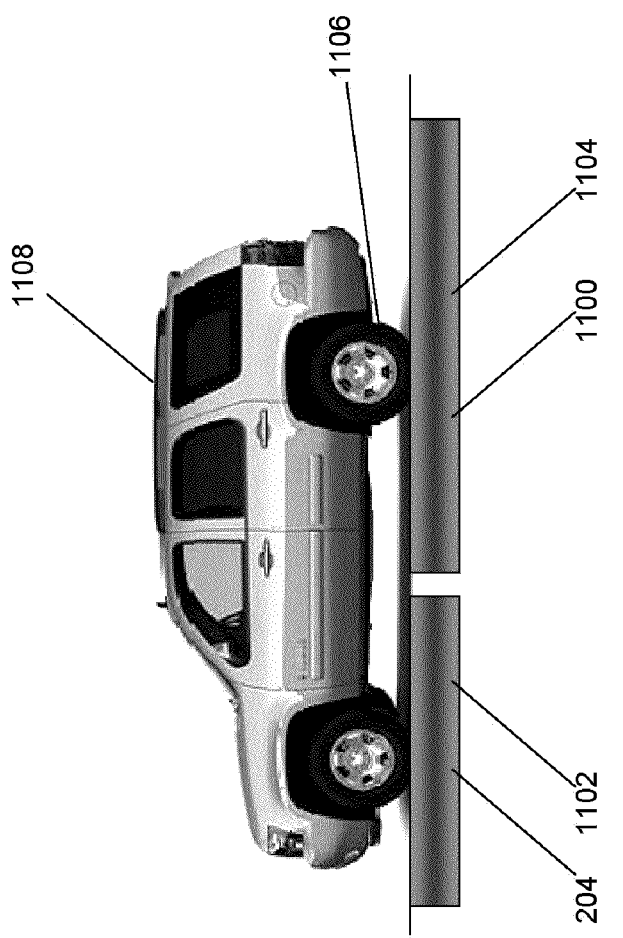

An exemplary weight scale system 204 in accordance with an embodiment of the present disclosure is shown in FIGS. 11A and 11B. FIG. 11A shows a side view of the exemplary weight scale system 204 with vehicle 1108 on the weight scale system 204, and FIG. 11B shows a top view of the exemplary weight scale system 204 with plurality of sectional scales 1100.

As shown in FIGS. 11A and 11B, the weight scale system 204 includes the plurality of sectional scales 1100, one sectional scale 1100 for each wheel 1106 of the vehicle 1108. In one embodiment, the plurality of sectional scales 1100 includes at least two sectional scales including a front sectional scale 1102 and a rear sectional scale 1104. In another embodiment, the plurality of sectional scales 1100 includes at least four sectional scales including a front-right sectional scale 1102R, a front-left sectional scale 1102L, a rear-right sectional scale 1104R, and a rear-left sectional scale 1104L.

In one embodiment, the two rear sectional scales (i.e., the rear-right sectional scale 1104R, and the rear-left sectional scale 1104L) are configured to be longer than the two front sectional scales (i.e., the front-right sectional scale 1102R, and the front-left sectional scale 1102L) to accommodate different wheelbase length of the vehicle.

The design and functionality of this particular sectional vehicle weight scale system 204 (i.e., where it is divided into four independent sectional scales) is configured to not only capture data of a vehicle's overall weight, but also independently calculate the amount of weight on the right front tire, the left front tire, the right rear tire, the left rear tire, as well as the front tires and the rear tires.

In one embodiment, the individual sectional scales 1100 for each wheel 1106 of the vehicle 1108 may be in the form of a load cell that includes a transducer or any other electronic device that is configured to convert a force (i.e., exerted by the vehicle or wheels of the vehicle), which is sensed by a strain gauge, into an electrical signal. For example, the individual sectional scales 1100 may be HAENNI® Wheel Load Scales (manufacturer part number: WL 101) or Wheel Load Sensors (manufacturer part number: WL 110) available from HAENNI® Wheel Load Scales, a division of Baumer Bourdon-Haenni Inc.

In one embodiment, the individual sectional scales 1100 for each wheel 1106 of the vehicle 1108 are disposed on a level surface. Such individual sectional scales 1100 when disposed on the level surface are configured to determine the lateral position of the vehicle's center of mass. In one embodiment, the center of mass measurements from the sectional scales that are disposed on the flat-plane or level-surface are taken at the final stop position of the vehicle before that vehicle proceeds to the primary inspection station.

In another embodiment, the individual sectional scales 1100 for each wheel 1106 of the vehicle 1108 are disposed on an inclined plane. Such individual sectional scales 1100 when disposed on the inclined plane are configured to determine the height of the center-of-mass position in addition to its lateral location or position. In one embodiment, the center of mass measurements from the sectional scales that are disposed on the inclined-plane are taken at the booth in front of the border patrol officer. Inclined tracks are general used at check points to improve the border patrol officer's field of view into the vehicle.

In one embodiment, these two sets of center of mass measurements (i.e., one set obtained from the sectional scales on the level surface and another set obtained from the sectional scales on the inclined plane) may be directly incorporated into the system 200 to determine the height of the center-of-mass position along with its lateral location or position. The height of the center-of-mass position along with its lateral location or position may be used to determine angular momentum characteristics of the vehicle that may be used to detect the concealed passenger and/or cargo.

In one embodiment, the actual center of mass position may be measured while the vehicle is in motion. For example, a variant of a commercial weight in motion (WIM) system with a radar gun input may be used to obtain the actual center of mass position of a vehicle in motion. In such an embodiment, the processor 206 is configured to use a statistical algorithm to determine if the vehicle is overweight based on a predicted model. If the vehicle is overweight, the vehicle is directed to a more stringent search lane or area for further searching or screening. If the vehicle is within the predicted weight, the vehicle is passed through with minimal delay (i.e., without impacting traffic throughput). That is, the actual center of mass position may be obtained while the vehicle is still approaching the border patrol check point so that by the time the vehicle reaches the border patrol check point, it is determined whether or not the vehicle needs any additional searching.

In one embodiment, the system 200 may include the user interface 208, which is in communication with the processor 206. The user interface 208 is configured to accept input from a user (e.g., border patrol officer or border patrol personnel), and optionally to transmit (and display) output (i.e., signal if the actual center of mass position of the vehicle departs from the predicted center of mass position of the vehicle by at least a predetermined threshold) of the system 200.

In one embodiment, the user interface 208 may include a keypad that allows the user (e.g., border patrol officer or border patrol personnel) to enter the vehicle loading data into the processor 206. Such vehicle loading data may include, for example, number of passengers in the vehicle, location of the passengers in the vehicle, sex of the passengers in the vehicle, body structure (e.g., large, medium or small built) of the passengers, fuel tank level in the vehicle, a mode of travel and/or whether one or more of the passengers in the vehicle is an adult or a child. In one embodiment, the mode of travel is a vacation mode.

In one embodiment, the border patrol officer may input the fuel tank level by looking at the fuel gauge (located on the instrument panel of the vehicle) during a vehicle stop. Since make, model and year of the vehicle are already known, the amount of fuel can be estimated.

In one embodiment, the user interface 208 may include a display screen that provides a visual data output (e.g., signal if the actual center of mass position of the vehicle departs from the predicted center of mass position of the vehicle by at least a predetermined threshold) to the user (e.g., border patrol officer or border patrol personnel). In one embodiment, the user interface 208 may be a graphical user interface. It may also include a printer or be connected to a printer so as to be able to print information from processor 206.

Instead of using the user interface 208 for inputting the vehicle loading data, in one embodiment, the system 200 may obtain the vehicle loading data, for example, automatically while the vehicle is in motion. For example, the system 200 may obtain the vehicle loading data using a Standoff Image Recognition system. In such embodiment, visible/IR cameras are placed along the point-of-entry path of the vehicle to automatically determine the number, the location and the type (built, and/or adult/child) of passengers in the vehicle. Therefore, by using Standoff Image Recognition or other automated processes to obtain the vehicle loading data, manual inputs from the border patrol officer may be reduced substantially.

The cameras (i.e., visible/IR) are positioned at multiple angles to capture images of the vehicle as the vehicle approaches a border patrol check point. These cameras (i.e., visible/IR) are configured to capture both IR and visible images of the vehicle as the vehicle is moving. In such embodiment, the processor 206, which is connected to the motor vehicles database, is configured to process the captured images of the vehicle a) to determine make, model, and year of the vehicle; and b) to obtain vehicle loading data (e.g., the number, the location and the type (built, and/or adult/child) of passengers in the vehicle). As noted above, once the make, the model and the year of the vehicle is determined from the captured images, the processor 206 uses the motor vehicles database to obtain the weight distribution data of the vehicle associated with obtained make and model.

In one embodiment, the processor 206 can comprise either one or a plurality of processors therein. In one embodiment, the processor 206 can be a part of or forming a computer system.

The processor 206 is configured to a) receive vehicle loading data; b) determine a predicted center of mass position of the vehicle using the vehicle loading data and the weight distribution data of the vehicle; c) compare the actual center of mass position of the vehicle with the predicted center of mass position of the vehicle; and d) provide a signal if the actual center of mass position of the vehicle departs from the predicted center of mass position of the vehicle by at least a predetermined threshold. The signal is representative of concealed cargo and/or concealed passengers in the vehicle. In one embodiment, the predetermined threshold is equal to a weight of full tank of gas of the vehicle.

As noted above, the vehicle loading data is input into the processor 206 automatically or by the user (e.g., border patrol officer or border patrol personnel) via the user interface 208.

In one embodiment, the processor 206, based on the input data or information, is configured to localize where in the vehicle (e.g., left, right, front, or rear/back) an anomalous weight is located. In other words, the processor 206 is configured to determine one or more particular locations in the vehicle where the concealed cargo and/or the concealed passengers is in the vehicle. In one embodiment, the one or more particular locations includes a dashboard space, an instrument panel space, a trunk compartment, a passenger space, or an engine compartment of the vehicle. In one embodiment, the passenger space may include space under the passenger seats in the vehicle.

In one embodiment, each of the actual center of mass position of the vehicle and the predicted center of mass position of the vehicle are calculated by the processor 206 in a two-dimensional space. In such an embodiment, sectional scales (for each wheel of the vehicle) disposed on a level surface are used to determined the actual center of mass position of the vehicle as explained above.

In another embodiment, each of the actual center of mass position of the vehicle and the predicted center of mass position of the vehicle are calculated by the processor 206 in a three-dimensional space. In such an embodiment, a height of the actual center of mass position of the vehicle is determined by using the sectional scales (for each wheel of the vehicle) disposed on an inclined plane as explained above.

In one embodiment, the processor 206 is configured to compare the actual center of mass position of the vehicle, against predicted center of mass position of the vehicle (broken down by gross overall center of mass position, center of mass position on the left front tire, center of mass position on the right front tire, center of mass position on the left rear tire, center of mass position on the right rear tire, center of mass position on the front tires and center of mass position on the rear tires), for the identified make/model of vehicle.

In one embodiment, the system 200 may includes a local database that is configured to store information about the vehicle after validating the provided error signal (i.e., the actual center of mass position of the vehicle departs from the predicted center of mass position of the vehicle by the predetermined threshold). The local database is in communication with the processor 206, for example, over a wired or a wireless network.

The comparison between the actual center of mass position of the vehicle and the predicted center of mass position of the vehicle may be done in parallel with the generally performed primary screening process. The vehicle with anomalous center of mass may be referred to secondary inspection to determine what the source of the irregular weight (i.e., whether it is a person, legitimate cargo or contraband).

Once the vehicle is flagged for further searching and/or secondary inspection, any number of tools and technologies may be used to conduct the secondary inspection. For example, tools and technologies that are used to conduct the secondary inspection, may include further weighing without passengers, further weighing with all luggage unloaded, hand searching by the border patrol personnel at the secondary inspection station, canine searching, performing x-ray analysis of the vehicle, etc.

Once the vehicle of interest is searched at the secondary inspection station, the border patrol officer at the secondary inspection station enters the information about the secondary search and the related search results into a database against the vehicle of interest. The information about the secondary search may include date, time and the location where the secondary search was performed. The results of the secondary search may include 1) measured weight (in pounds or kilograms) of such anomalous or irregular weight, 2) whether the anomalous or irregular weight is a person, legitimate or illegitimate cargo, or contraband, for example; and 3) the location of such anomalous or irregular weight in the vehicle. The process of entering the information about the secondary search and the related search results into the local database against the vehicle of interest provides a constant feedback to the system 200. Using such constant feedback, a learning algorithm and/or person may adjust the 'flag' weight (up or down) for each type (make, model, and year) of vehicle.

Figure 3:
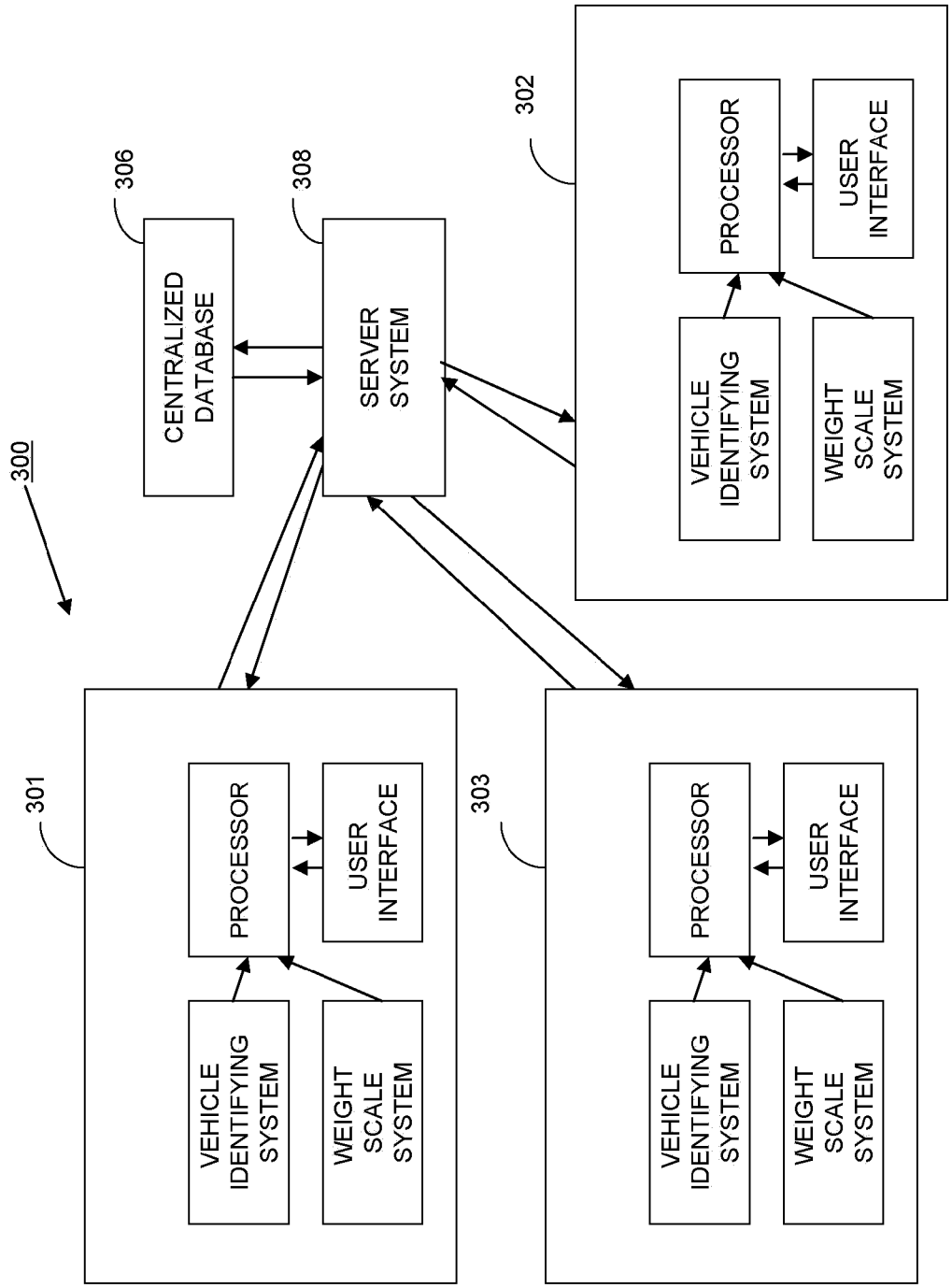
FIG. 3 shows a shared network system that includes a plurality of geographically separate systems for detecting concealed cargo and/or concealed passengers in a vehicle in accordance with another embodiment of the present disclosure.

FIG. 3 shows a shared network system 300 that includes a plurality of geographically separate systems 301, 302, and 303 for detecting concealed cargo and/or concealed passengers in a vehicle. The shared network system 300 is configured to share the information about the vehicle (for which the actual center of mass position of the vehicle departed from the predicted center of mass position of the vehicle by the predetermined threshold) between the plurality of geographically separate systems 301, 302, and 303.

FIG. 3 shows only three geographically separate systems 301, 302, and 303, however, it is contemplated that the number of geographically separate systems in shared network system 300 can vary significantly in number.

The shared network system 300 includes a plurality of geographically separate systems 301, 302, and 303, a centralized database 306, and a centralized server system 308. Each of the geographically separate systems 301, 302, and 303 is similar to the system 200 (as shown in and described with respect to FIG. 2), and hence will not be explained in detail here. Each of the geographically separate systems 301, 302, and 303 is in communication with the centralized server system 308, for example, over a wired or a wireless network.

The centralized database 306 is configured to store the information about the vehicle (for which the actual center of mass position of the vehicle departed from the predicted center of mass position of the vehicle by the predetermined threshold). In one embodiment, the centralized database 306 is directly in communication with each of the geographically separate systems 301, 302, and 303, for example, over a wired or a wireless network, to receive the information about the vehicle from these geographically separate systems 301, 302, and 303. In another embodiment, the centralized database 306 is updated with this vehicle information by the centralized sever system 308.

The centralized database 306 facilitates more targeted and accurate searches performed the border patrol officers, reducing the search burden of the border patrol officers and limiting delays for normal travelers. That is, the centralized database 306 provides a history about a particular vehicle of interest. This history may include information of the vehicle such as, but not limited to, whether the vehicle of interest was flagged before for carrying concealed contraband, cargo, and/or passenger, whether concealed contraband, cargo, and/or passenger was detected in the vehicle of interest, or whether the weight and/or the center of mass has varied significantly over time.

In one embodiment, the centralized server system 308 is connected with each of the plurality of systems 301, 302, and 303, and the centralized database 306, for example, over a wired or a wireless network. The server system 308 is configured to 1) receive the information about the vehicle from one or more of the plurality of geographically separate systems 301, 302, and 303; 2) store the information about the vehicle in the centralized database 306; 3) provide the stored information in response to an inquiry from one or more of the of the plurality of geographically separate systems 301, 302, and 303.

In one embodiment, the centralized server system 308 is configured to generate an alarm when a number of border crossings by the flagged vehicle (i.e., a vehicle flagged in the database for carrying concealed contraband, cargo, and/or passenger) at a checkpoint is greater than a first threshold value, and/or change in center of mass position of the flagged vehicle is greater than a second threshold value. The first and the second threshold values are predetermined values that may be determined based on the history of the flagged vehicle that is stored in the centralized database. The first and the second threshold values are stored in the centralized database.

Figure 6:
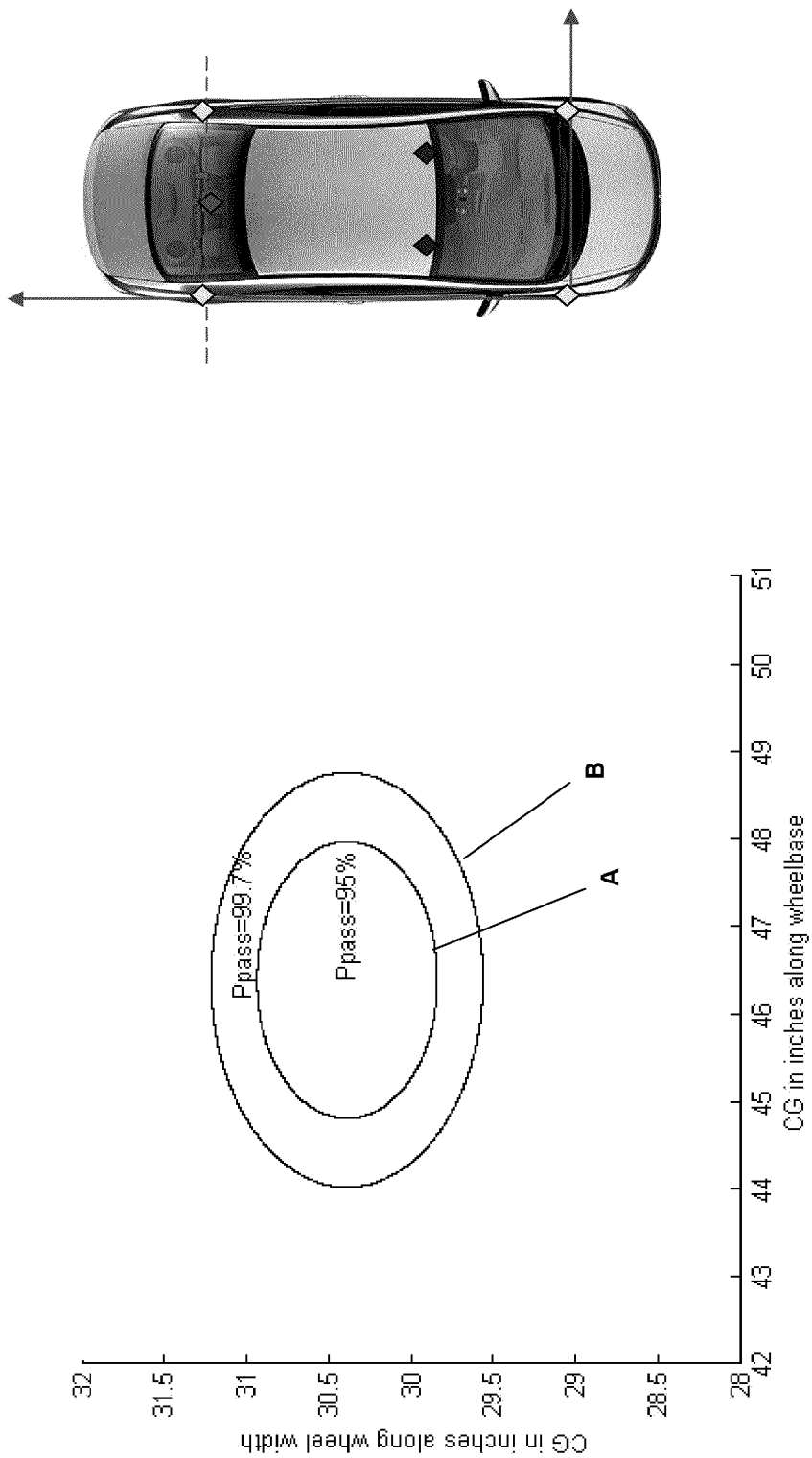
FIG. 6 shows ambiguity profiles for a vehicle without concealed passenger/cargo in accordance with an embodiment of the present disclosure.

FIG. 6 shows ambiguity profiles for a vehicle without concealed passenger/cargo in accordance with an embodiment of the present disclosure. The ambiguity profiles shown in FIG. 6 are for Honda Civic. The graph in FIG. 6 illustrates the center of gravity or mass along the wheelbase of the vehicle, expressed in inches, on a horizontal x-axis. On a vertical y-axis, the graph illustrates the center of gravity or mass along the wheel width of the vehicle, expressed in inches. FIG. 6 shows two elongated circles A and B that represent the ambiguity profiles of the vehicle without hidden passengers. For the data shown in FIG. 6, the probability of pass for elongated circle A is 95%, and the probability of pass for elongated circle B is 99.7%.

Figure 7:
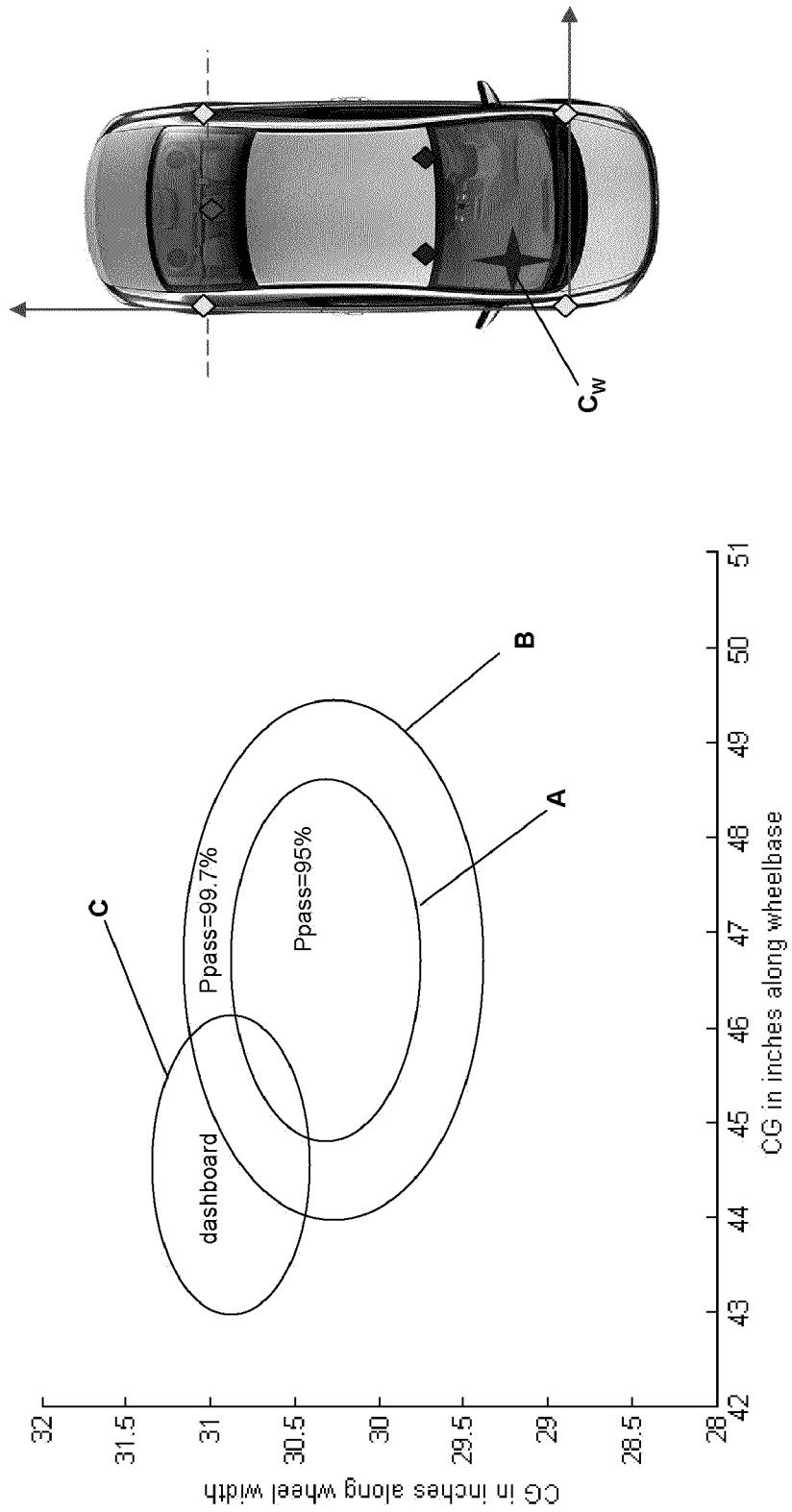
FIG. 7 shows ambiguity profiles for a vehicle without concealed passenger/cargo, and with a passenger/cargo concealed in dashboard in accordance with an embodiment of the present disclosure.

FIG. 7 shows ambiguity profiles for a vehicle without concealed passenger/cargo, and with a passenger/cargo concealed in dashboard in accordance with an embodiment of the present disclosure. The ambiguity profiles shown in FIG. 7 are for Honda Civic. The graph in FIG. 7 illustrates the center of gravity or mass along the wheelbase of the vehicle, expressed in inches, on a horizontal x-axis. On a vertical y-axis, the graph illustrates the center of gravity or mass along the wheel width of the vehicle, expressed in inches. The graph in FIG. 7 shows two elongated circles A and B that represent the ambiguity profiles of the vehicle without hidden passengers. In addition the graph in FIG. 7 shows an elongated circle C that represent the ambiguity profile of the vehicle with passenger (e.g., 150 pound passenger) hidden in the dashboard.

For the data shown in FIG. 7, probability of detection ($P_d$) of the hidden passenger is found to be greater than 90%, and the probability of false alarm ($P_{fa}$) is less found to be than 10%. The elongated circle C represents 95% of the results with a variance of 2 sigma ($\sigma$). The probability of pass for elongated circle A is 95%, and the probability of pass for elongated circle B is 99.7%.

Figure 8:
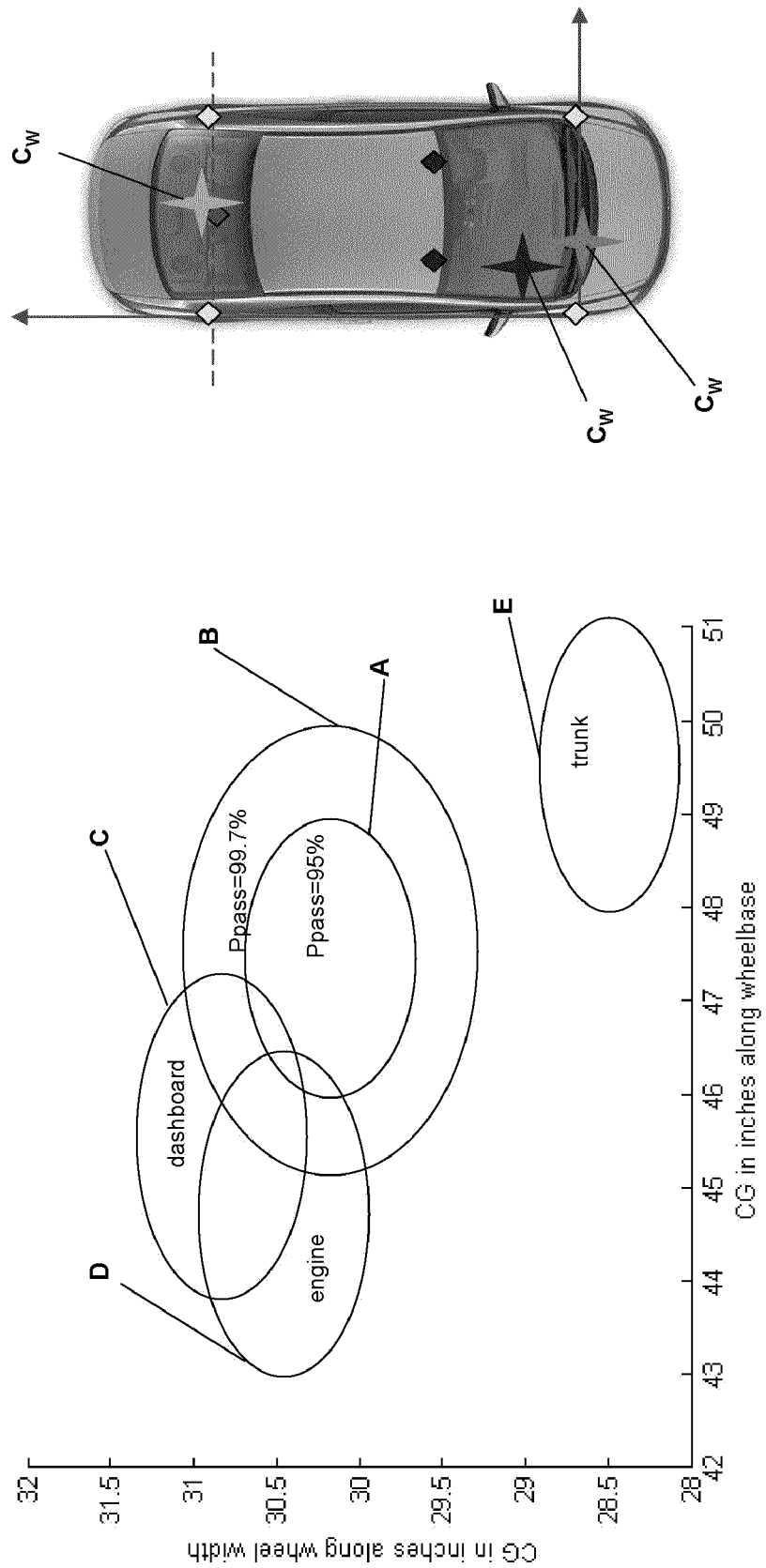
FIG. 8 shows ambiguity profiles for a vehicle without concealed passenger/cargo, and with passengers/cargo concealed in dashboard, engine compartment, and trunk in accordance with an embodiment of the present disclosure.

FIG. 8 shows ambiguity profiles for a vehicle without concealed passenger/cargo, and with passengers/cargo concealed in dashboard, engine compartment, and trunk in accordance with an embodiment of the present disclosure. The ambiguity profiles shown in FIG. 8 are for Honda Civic. The graph in FIG. 8 illustrates the center of gravity or mass along the wheelbase of the vehicle, expressed in inches, on a horizontal x-axis. On a vertical y-axis, the graph illustrates the center of gravity or mass along the wheel width of the vehicle, expressed in inches. The graph in FIG. 8 shows two elongated circles A and B that represent the ambiguity profiles of the vehicle without hidden passengers. In addition the graph in FIG. 8 shows elongated circles C, D, and E that represent the ambiguity profile of the vehicle with passenger (e.g., 150 pound passenger) hidden in the dashboard, in the engine and in the trunk, respectively.

For the data shown in FIG. 8, probability of detection ($P_d$) of the hidden passenger is found to be greater than 90%, and the probability of false alarm ($P_{fa}$) is less found to be than 10%. The elongated circles C, D, and E represents 95% of the results with a variance of 2 sigma ($\sigma$). As shown in FIG. 8, the probability of detection ($P_d$) of the hidden passenger in the trunk is strong, and the probability of detection ($P_d$) of the hidden passenger in the dashboard and the engine compartment is relatively weak. The probability of pass for elongated circle A is 95%, and the probability of pass for elongated circle B is 99.7%.

Figure 9:
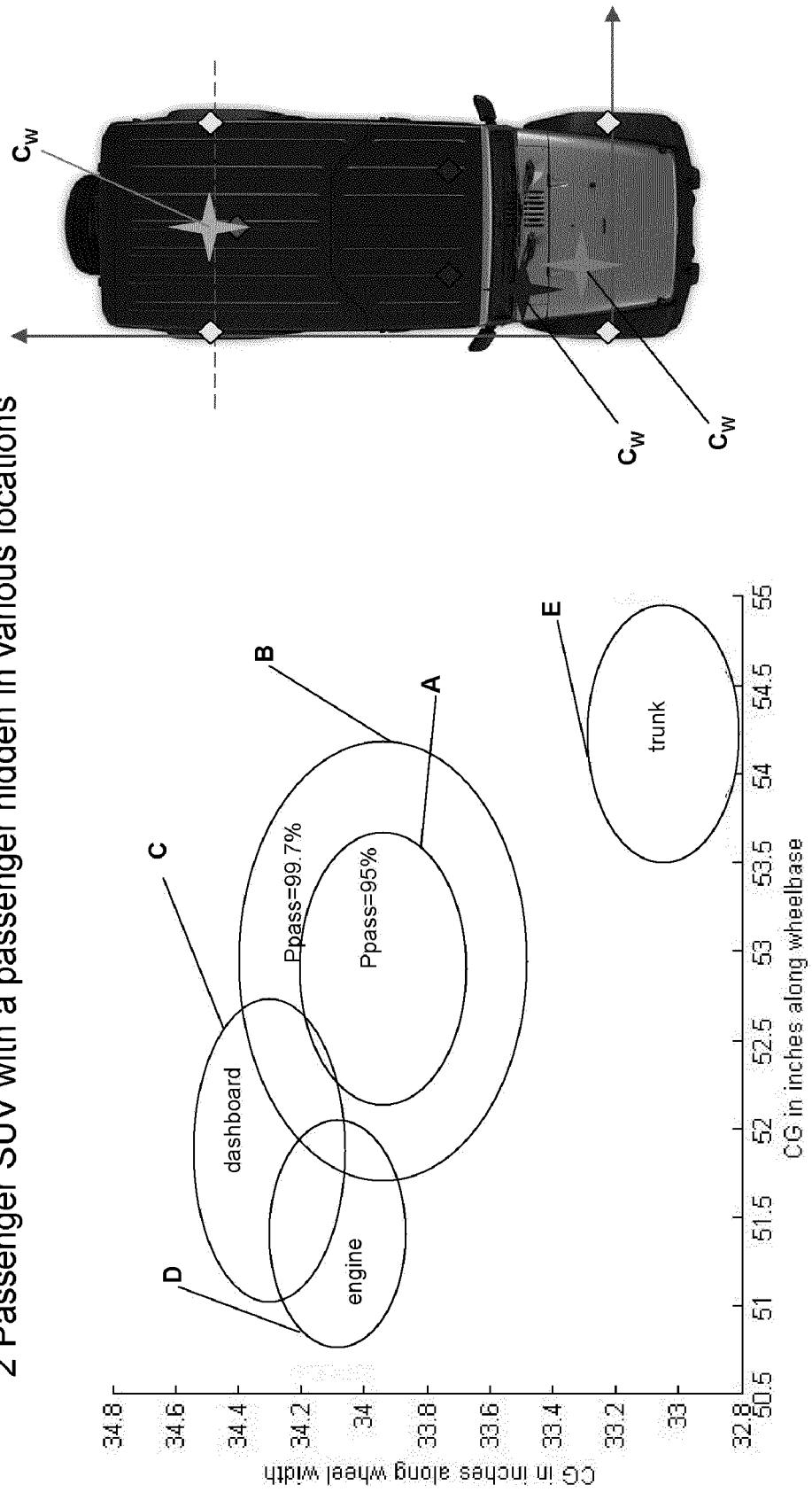
FIG. 9 shows ambiguity profiles for a vehicle (with a different wheel base) without concealed passenger/cargo, and with passengers/cargo concealed in dashboard, engine compartment, and trunk in accordance with an embodiment of the present disclosure.

FIG. 9 shows ambiguity profiles for a vehicle (with a different wheel base) without concealed passenger/cargo, and with passengers/cargo concealed in dashboard, engine compartment, and trunk in accordance with an embodiment of the present disclosure. The ambiguity profiles shown in FIG. 9 are for Chevy Tahoe. The graph in FIG. 9 illustrates the center of gravity or mass along the wheelbase of the vehicle, expressed in inches, on a horizontal x-axis. On a vertical y-axis, the graph illustrates the center of gravity or mass along the wheel width of the vehicle, expressed in inches. The graph in FIG. 9 shows two elongated circles A and B that represent the ambiguity profiles of the vehicle without hidden passengers. In addition the graph in FIG. 9 shows elongated circles C, D, and E that represent the ambiguity profile of the vehicle with passenger (e.g., 150 pound passenger) hidden in the dashboard, in the engine and in the trunk, respectively.

For the data shown in FIG. 9, probability of detection ($P_d$) of the hidden passenger is found to be greater than 99%, and the probability of false alarm ($P_{fa}$) is less found to be than 1%. The elongated circles C, D, and E represents 95% of the results with a variance of 2 sigma ($\sigma$). As shown in FIG. 9, the probability of detection ($P_d$) of the hidden passenger in the trunk is strong, and the probability of detection ($P_d$) of the hidden passenger in the dashboard is weak. The probability of pass for elongated circle A is 95%, and the probability of pass for elongated circle B is 99.7%.

Figure 10:
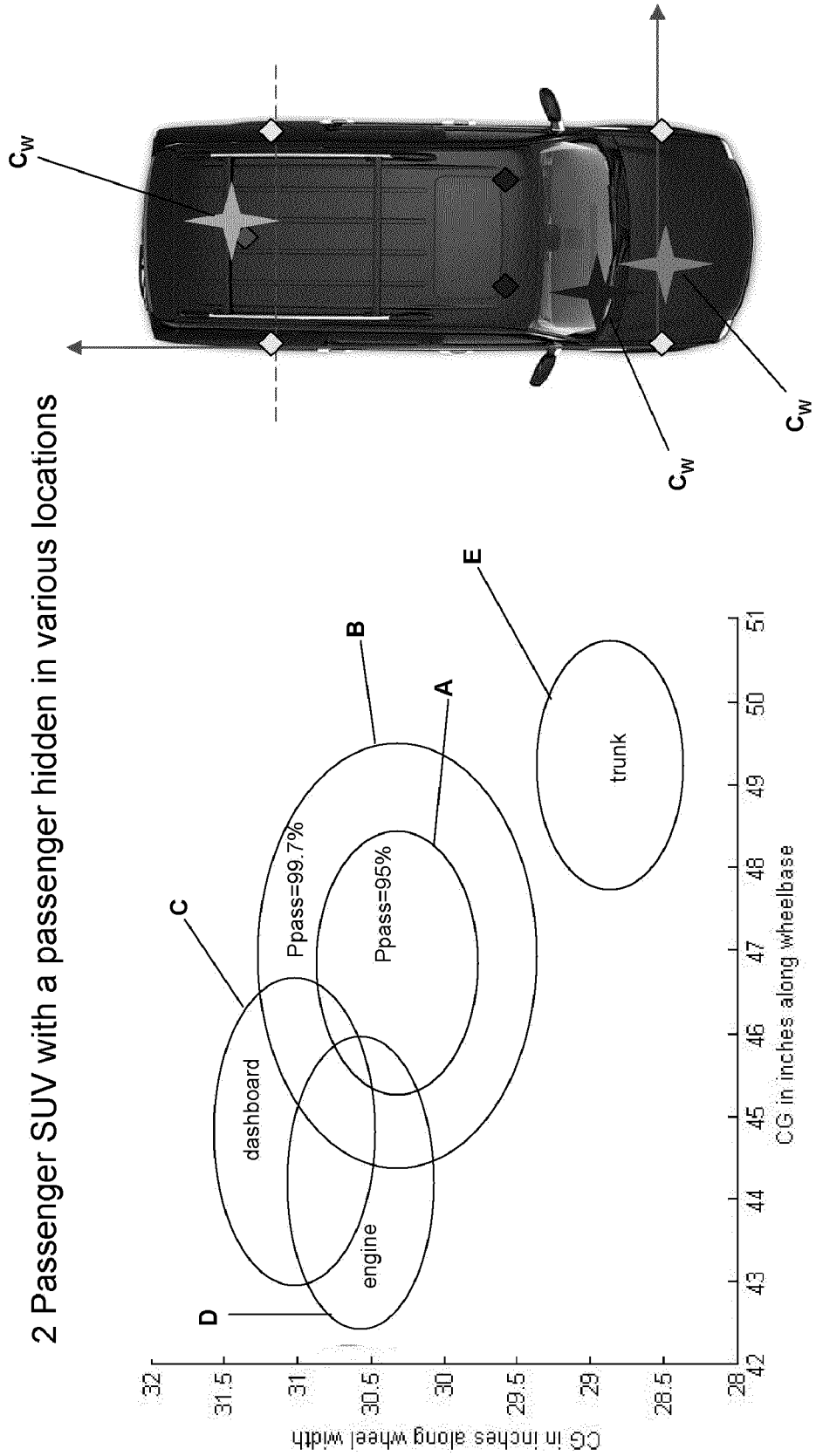
FIG. 10 shows ambiguity profiles for a vehicle (with a different wheel base) without concealed passenger/cargo, and with passengers/cargo concealed in dashboard, engine compartment, and trunk in accordance with an embodiment of the present disclosure.

FIG. 10 shows ambiguity profiles for a vehicle (with a different wheel base) without concealed passenger/cargo, and with passengers/cargo concealed in dashboard, engine compartment, and trunk in accordance with an embodiment of the present disclosure. The ambiguity profiles shown in FIG. 10 are for Jeep Wrangler. The graph in FIG. 10 illustrates the center of gravity or mass along the wheelbase of the vehicle, expressed in inches, on a horizontal x-axis. On a vertical y-axis, the graph illustrates the center of gravity or mass along the wheel width of the vehicle, expressed in inches. The graph in FIG. 10 shows two elongated circles A and B that represent the ambiguity profiles of the vehicle without hidden passengers. In addition the graph in FIG. 10 shows elongated circles C, D, and E that represent the ambiguity profile of the vehicle with passenger hidden (e.g., 130 pound passenger) in the dashboard, in the engine and in the trunk, respectively.

For the data shown in FIG. 10, probability of detection ($P_d$) of the hidden passenger is found to be greater than 95%, and the probability of false alarm ($P_{fa}$) is less found to be than 5%. The elongated circles C, D, and E represents 95% of the results with a variance of 2 sigma ($\sigma$). As shown in FIG. 10, the probability of detection ($P_d$) of the hidden passenger in the trunk is strong, and the probability of detection ($P_d$) of the hidden passenger in the dashboard is weak. The probability of pass for elongated circle A is 95%, and the probability of pass for elongated circle B is 99.7%.

As noted above, the presence of a concealed person or a concealed cargo, particularly in a passenger vehicle, generally creates a noticeable perturbation in the weight and weight distribution of a vehicle. In other words, the vehicle may exhibit readily noticeable changes in their handling capabilities and/or suspension due to a presence of an anomalous mass. That is, the passenger vehicles are not designed to drive around with a 150-300 pounds of unexpected weight, for example, in either the trunk, under the passenger seats, or even the dashboard. Taking advantage of this fact, the system 200 may include a series of bumps and ridges that are placed in the vehicle's path causing the vehicle to vibrate and oscillate in a pre-defined way. By interleaving weight scales between theses bumps and ridges, deviations from the "DC" weight of the vehicle may be measured and then used to more accurately determine polar moment of inertia and center of gravity of the vehicle, thus, providing further spatial resolution into the weight distribution of the vehicle.

In one embodiment, when a vehicle is passing by a particular checkpoint, weights and weight distribution of that vehicle at certain timestamps may be recorded (i.e., against that particular vehicle) as metadata and stored in a database. This information allows the system to correlate vehicle weight with specific regions/locations where weight changes may have occurred. This information also allows forensic analysis team to determine the approximate location at which a vehicle picked up the excess weight in the first place. Such capabilities have applications in counter-terror and counter-narcotic operations, where it's valuable to know when and approximately where someone added a heavy bomb (or other contraband load, i.e., drugs, guns, chemicals, etc.) to a specific car.

In one embodiment, the system 200 and the method 100 of the present disclosure may use an absolute weight thresholding in addition to the above described shift in the center of mass position. In other words, an absolute weight of the vehicle is measured (e.g., using the weight scale system) and a weight difference signal is provided to the system 200 if the absolute weight of the vehicle departs from a predicted/estimated weight (e.g., may be obtained from the vehicle loading data and the weight distribution data of the vehicle) of the vehicle by at least a predetermined threshold. Such weight difference signal is used by the system 200 (along with or) in addition to the center of mass position shift signal to detect concealed cargo and/or concealed passengers in the vehicle. For example, in the case of a contraband hidden in the passenger compartment, the center of mass position shift may not be very significant (i.e., the actual center of mass position may be close to the predicted center of mass position). In such a case, use of weight difference signal (i.e., in addition to the center of mass position shift signal) may enable the system 200 to detect concealed contraband under the passenger seat more accurately.

The system 200 and the method 100 of the present disclosure provide a fact-based assessment that supports the border patrol officer. In other words, the system and the method of the present disclosure provides a weight-based assessment tool for a border patrol personnel to recommend a secondary inspection of the vehicle, thus, improving his or her chances of flagging a vehicle likely to harbor a concealed person/cargo. The system 200 and the method 100 of the present disclosure integrates well and runs in the background of generally used primary inspection protocol or process, thus, requiring minimal interrogation time. The system 200 and the method 100 of the present disclosure provides a low cost solution, for example, that independent sectional scales used measure the weight distribution of passenger vehicles may be purchased at a low cost (e.g., for less than $5k).

The system 200 and the method 100 of the present disclosure provides the Department of Homeland Security with a quick determination of possible concealed human cargo or other illegal contraband (drugs, weapons, chemicals, etc.) hidden in vehicles as the vehicle is attempting to enter the US.

The system and the method described above in accordance with various embodiments of the present disclosure may be used not only to prevent passenger/cargo smuggling (i.e., by detecting the concealed cargo/passenger in the vehicle) but also to provide security for high value facilities, where concealed passengers, contraband or large explosives are a potential threat. In such an embodiment, where the method and the system provides security for high value facilities, the method and system are configured to detect large explosives for hostile threat recognition. For example, such high value facilities may include embassies, banks, prisons, oversea military bases, infrastructure assets, such as nuclear power plants, electrical power plants, national labs, etc., or any other location that can and should be protected. Also, the method and the system described above in accordance with embodiments of the present disclosure may provide improved border security by detecting smuggled contraband, weapons, drugs and personnel.

In the aspects of an embodiment described herein, the processor, for example, may be implemented in hardware, firmware, software, or various combinations thereof, and may also be implemented as instructions stored on a machine-readable medium, which may be read and executed using one or more processors. In one embodiment, the machine-readable medium may include various mechanisms for storing and/or transmitting information in a form that may be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and embodiments performing certain actions, it will be apparent that such descriptions are merely for the sake of convenience and that such actions in fact result from computing devices, processing devices, processors, controllers, or other devices or machines executing the firmware, software, routines, or instructions.

Although the present disclosure has been described in detail for the purpose of illustration, it is to be understood that such detail is solely for that purpose and that the inventive concept is not limited to the disclosed embodiments, but, on the contrary, is intended to cover modifications and equivalent arrangements that are within the spirit and scope of the appended claims. In addition, it is to be understood that the present disclosure contemplates that, to the extent possible, one or more features of any embodiment may be combined with one or more features of any other embodiment.

What is claimed is:

1. A computer-implemented method for detecting concealed cargo and/or concealed passengers in a vehicle, wherein the method is implemented in a computer system comprising one or more processors configured to execute one or more computer program modules, the method comprising:
obtaining weight distribution data for the vehicle using a vehicle identifying system;
obtaining vehicle loading data;
measuring a center of mass of the vehicle using a weight scale system to obtain an actual center of mass position of the vehicle; and
executing, on the one or more processors of the computer system, one or more computer program modules configured to:
predict a center of mass position of the vehicle using the obtained vehicle loading data and the obtained weight distribution data of the vehicle;
compare the actual center of mass position of the vehicle with the predicted center of mass position of the vehicle; and
provide an error signal if the actual center of mass position of the vehicle departs from the predicted center of mass position of the vehicle by at least a predetermined threshold, the error signal being representative of concealed cargo and/or concealed passengers in the vehicle.

2. The method of claim 1, further comprising executing, on the one or more processors of the computer system, one or more computer program modules configured to determine one or more particular locations where the concealed cargo and/or the concealed passenger is in the vehicle.

3. The method of claim 2, wherein the one or more particular locations includes a dashboard space, an instrument panel space, a trunk compartment, a passenger space, or an engine compartment of the vehicle.

4. The method of claim 1, wherein each of the actual center of mass position of the vehicle and the predicted center of mass position of the vehicle are calculated in a two-dimensional space.

5. The method of claim 1, wherein each of the actual center of mass position of the vehicle and the predicted center of mass position of the vehicle are calculated in a three-dimensional space.

6. The method of claim 5, further comprising executing, on the one or more processors of the computer system, one or more computer program modules configured to determine a height of the actual center of mass position of the vehicle and a height of the predicted center of the mass position of the vehicle.

7. The method of claim 1, wherein the vehicle loading data comprises number of passengers in the vehicle, location of the passengers in the vehicle, sex of the passengers in the vehicle, body structure of the passengers, fuel tank level in the vehicle, a mode of travel and/or whether one or more of the passengers in the vehicle is an adult or a child.

8. The method of claim 7, wherein the mode of travel is a vacation mode.

9. The method of claim 1, wherein the predetermined threshold is equal to at least a portion of a weight of full tank of gas of the vehicle.

10. A system for detecting concealed cargo and/or concealed passengers in a vehicle, the system comprising:
a vehicle identifying system configured to obtain weight distribution data for the vehicle;
a weight scale system configured to measure a center of mass of the vehicle to obtain an actual center of mass position of the vehicle;
a processor configured to:
receive vehicle loading data;
predict a center of mass position of the vehicle using the vehicle loading data and the weight distribution data of the vehicle;
compare the actual center of mass position of the vehicle with the predicted center of mass position of the vehicle; and provide an error signal if the actual center of mass position of the vehicle departs from the predicted center of mass position of the vehicle by at least a predetermined threshold, the error signal being representative of concealed cargo and/or concealed passengers in the vehicle.

11. The system of claim 10, wherein the processor is further configured to determine one or more particular locations where the concealed cargo and/or the concealed passenger is in the vehicle.

12. The system of claim 10, wherein the vehicle identifying system comprises a database and a vehicle identifier.

13. The system of claim 12, wherein the vehicle identifier comprises a license plate reader, a VIN number reader, a RF tag reader, or an Automatic Target Recognition device.

14. The system of claim 10, wherein the predetermined threshold is equal to at least a portion of a weight of full tank of gas of the vehicle.

15. The system of claim 10, wherein the weight scale system comprises a plurality of sectional scales, one sectional scale for each wheel of the vehicle.

16. The system of claim 15, wherein the plurality of sectional scales includes at least two sectional scales.

17. The system of claim 15, wherein the plurality of sectional scales includes at least four sectional scales.

18. The system of claim 17, wherein two rear sectional scales are configured to be longer than two front sectional scales to accommodate different wheelbase length of the vehicle.

19. The system of claim 10, wherein the processor is further configured to determine a difference between an actual weight of the vehicle and an predicted weight of the vehicle, wherein the actual weight of the vehicle is measured using the weight scale system and the predicted weight of the vehicle is determined using the vehicle loading data and the weight distribution data.

20. The system of claim 19, wherein the processor is further configured to use the weight difference and the provided signal to detect the concealed cargo and/or the concealed passengers in the vehicle.

21. A shared network system comprising a plurality of geographically separate systems for detecting concealed cargo and/or concealed passengers in a vehicle, each system in said plurality of systems comprising:
  a vehicle identifying system configured to obtain weight distribution data for the vehicle;
  a weight scale system configured to measure a center of mass of the vehicle to obtain an actual center of mass position of the vehicle;
  a processor configured to:
    receive vehicle loading data;
    predict as center of mass position of the vehicle using the vehicle loading data and the weight distribution data of the vehicle;
    compare the actual center of mass position of the vehicle with the predicted center of mass position of the vehicle;
    provide an error signal if the actual center of mass position of the vehicle departs from the predicted center of mass position of the vehicle by at least a predetermined threshold, the error signal being representative of concealed cargo and/or concealed passengers in the vehicle; and
    store information about the vehicle after validating the provided error signal, wherein the shared network system is configured to share the information about the vehicle between the plurality of systems over a networked connection.

22. The shared network system of claim 21, further comprising
  a) a centralized database configured to store the information about the vehicle; and
  b) a server system configured to be coupled with each of the plurality of systems and the centralized database, the server system further configured to:
    1) receive the information about the vehicle from one or more of the plurality of geographically separate systems;
    2) store the information about the vehicle in the centralized database; and
    3) provide the stored information in response to an inquiry from one or more of the of the plurality of geographically separate systems.

23. The shared network system of claim 22, wherein the server system is further configured to generate an alarm, when number of border crossings of a vehicle of interest is greater than a first threshold value and/or change in center of mass position of the vehicle of interest is greater than a second threshold value.

* * * * *